United States Patent
Walczak et al.

(10) Patent No.: US 11,208,322 B2
(45) Date of Patent: Dec. 28, 2021

(54) SOLAR FUEL GENERATOR INCLUDING A CATALYTIC MESH

(71) Applicant: The Regents of the University of California, Oakland, CA (US)

(72) Inventors: Karl A. Walczak, Albuquerque, NM (US); Jeffrey W. Beeman, El Sobrante, CA (US); Ian D. Sharp, Garching (DE)

(73) Assignee: The Regents of the University of California, Oakland, CA (US)

( * ) Notice: Subject to any disclaimer, the term of this patent is extended or adjusted under 35 U.S.C. 154(b) by 173 days.

(21) Appl. No.: 16/245,595

(22) Filed: Jan. 11, 2019

(65) Prior Publication Data

US 2019/0144271 A1 May 16, 2019

Related U.S. Application Data

(63) Continuation of application No. PCT/US2017/040674, filed on Jul. 5, 2017.

(Continued)

(51) Int. Cl.
*C01B 3/04* (2006.01)
*C25B 1/00* (2021.01)
(Continued)

(52) U.S. Cl.
CPC ............... *C01B 3/042* (2013.01); *C01B 3/04* (2013.01); *C01B 3/047* (2013.01); *C25B 1/04* (2013.01);
(Continued)

(58) Field of Classification Search
CPC ....... C25B 1/003; Y02E 10/50; Y02E 10/544; Y02E 10/547; Y02E 10/52; Y02E 10/549;
(Continued)

(56) References Cited

U.S. PATENT DOCUMENTS

2003/0230337 A1* 12/2003 Gaudiana ............. H01G 9/2068
136/256
2004/0187917 A1* 9/2004 Pichler ..................... G02F 1/155
136/263

(Continued)

FOREIGN PATENT DOCUMENTS

WO    WO 2016/036521    3/2016

OTHER PUBLICATIONS

J. W. Ager, M. R. Shaner, K. A. Walczak, I. D. Sharp, S. Ardo,"Experimental demonstrations of spontaneous, solar-driven photoelectrochemical water splitting," Energy Environ. Sci. 2015, 8, 2811.

(Continued)

*Primary Examiner* — Imran Akram

(57) ABSTRACT

This disclosure provides systems, methods, and apparatus related to a solar fuel generator. In one aspect, a device includes a photovoltaic cell, the photovoltaic cell having a first surface and a second surface, a mesh disposed on the first surface of the photovoltaic cell, and a polymer disposed on the mesh and on the first surface of the photovoltaic cell. The mesh has a catalyst disposed thereon. The polymer covers the first surface of the photovoltaic cell, with at least a portion of the mesh not being covered with the polymer.

20 Claims, 9 Drawing Sheets

Related U.S. Application Data

(60) Provisional application No. 62/365,334, filed on Jul. 21, 2016.

(51) Int. Cl.

| | |
|---|---|
| C25B 3/04 | (2006.01) |
| C25B 9/08 | (2006.01) |
| C25B 1/12 | (2006.01) |
| C25B 1/04 | (2021.01) |
| C25B 1/55 | (2021.01) |
| C25B 3/25 | (2021.01) |
| C25B 9/05 | (2021.01) |
| C25B 9/19 | (2021.01) |

(52) U.S. Cl.
CPC .................. *C25B 1/55* (2021.01); *C25B 3/25* (2021.01); *C25B 9/05* (2021.01); *C25B 9/19* (2021.01); *C25B 1/00* (2013.01); *Y02E 60/36* (2013.01)

(58) Field of Classification Search
CPC ........... Y02E 10/543; H01L 31/022425; H01L 31/02021; H01L 31/02167; H01L 31/042
See application file for complete search history.

(56) References Cited

U.S. PATENT DOCUMENTS

| | | | |
|---|---|---|---|
| 2005/0040374 A1* | 2/2005 | Chittibabu ........... | H01G 9/2031 252/501.1 |
| 2005/0072458 A1* | 4/2005 | Goldstein ............. | H01G 9/2068 136/251 |
| 2005/0211569 A1 | 9/2005 | Botte et al. | |
| 2007/0017566 A1 | 1/2007 | Gaudiana et al. | |
| 2007/0251570 A1* | 11/2007 | Eckert .................. | H01G 9/2068 136/256 |
| 2008/0276987 A1* | 11/2008 | Flood .................. | H01L 31/1832 136/256 |
| 2010/0021794 A1* | 1/2010 | Kim .................... | H01M 4/8803 429/509 |
| 2010/0028545 A1* | 2/2010 | Choi .................... | C09D 133/26 427/385.5 |
| 2010/0206362 A1* | 8/2010 | Flood .............. | H01L 31/035281 136/252 |
| 2011/0220191 A1* | 9/2011 | Flood .................... | B82Y 30/00 136/255 |
| 2011/0300661 A1 | 12/2011 | Pearce et al. | |
| 2014/0000682 A1 | 1/2014 | Zhao | |
| 2014/0021034 A1* | 1/2014 | Lewis .................... | H01G 9/20 204/157.15 |
| 2015/0101664 A1 | 4/2015 | Hu et al. | |
| 2016/0071655 A1* | 3/2016 | Li ....................... | H01L 31/1888 136/254 |

OTHER PUBLICATIONS

M. M. May, H.-J. Lewerenz, D. Lackner, F. Dimroth, T. Hannappel, "Efficient direct solar-to-hydrogen conversion by in situ interface transformation of a tandem structure," Nat. Commun. 2015, 6, 8286.
E. Verlage, S. Hu, R. Liu, R. J. R. Jones, K. Sun, C. Xiang, N. S. Lewis, H. A. Atwater, "A monolithically integrated, intrinsically safe, 10% efficient, solar-driven water-splitting system based on active, stable earth-abundant electrocatalysts in conjunction with tandem III-V light absorbers protected by amorphous $TiO_2$ films," Energy Environ. Sci. 2015, 8, 3166.
J. Luo, D. A. Vermaas, D. Bi, A. Hagfeldt, W. A. Smith, M. Gratzel, "Bipolar Membrane-Assisted Solar Water Splitting in Optimal pH," Adv. Energy Mater. 2016, 6, 1600100.
S. Chen, L.-W. Wang, "Thermodynamic Oxidation and Reduction Potentials of Photocatalytic Semiconductors in Aqueous Solution," Chem. Mater. 2012, 24, 3659.
S. Hu, N. S. Lewis, J. W. Ager, J. Yang, J. R. McKone, N. C. Strandwitz, "Thin-Film Materials for the Protection of Semiconducting Photoelectrodes in Solar-Fuel Generators," J. Phys. Chem. C 2015, 119, 24201.
A. G. Scheuermann, P. C. McIntyre, "Atomic Layer Deposited Corrosion Protection: A Path to Stable and Efficient Photoelectrochemical Cells," J. Phys. Chem. Lett. 2016, 7, 2867.
R. Liu, Z. Zheng, J. Spurgeon, X. Yang, "Enhanced photoelectrochemical water-splitting performance of semiconductors by surface passivation layers," Energy Environ. Sci. 2014, 7, 2504.
A. Paracchino, V. Laporte, K. Sivula, M. Graetzel, E. Thimsen, "Highly active oxide photocathode for photoelectrochemical water reduction," Nat. Mater. 2011, 10, 456.
Y. W. Chen, J. D. Prange, S. Duehnen, Y. Park, M. Gunji, C. E. D. Chidsey, P. C. McIntyre, "Atomic layer-deposited tunnel oxide stabilizes silicon photoanodes for water oxidation," Nat. Mater. 2011, 10, 539.
M. Haro, C. Solis, G. Molina, L. Otero, J. Bisquert, S. Gimenez, A. Guerrero, "Toward Stable Solar Hydrogen Generation Using Organic Photoelectrochemical Cells," J. Phys. Chem. C 2015, 119, 6488.
H. Kumagai, T. Minegishi, N. Sato, T. Yamada, J. Kubota, K. Domen, "Efficient solar hydrogen production from neutral electrolytes using surface-modified Cu(In,Ga)Se2 photocathodes," J. Mater. Chem. A 2015, 3, 8300.
K. Sun, M. T. McDowell, A. C. Nielander, S. Hu, M. R. Shaner, F. Yang, B. S. Brunschwig, N. S. Lewis, "Stable Solar-Driven Water Oxidation to O2(g) by Ni-Oxide-Coated Silicon Photoanodes," J. Phys. Chem. Lett. 2015, 6, 592.
J. Yang, K. Walczak, E. Anzenberg, F. M. Toma, G. Yuan, J. Beeman, A. Schwartzberg, Y. Lin, M. Hettick, A. Javey, "Efficient and Sustained Photoelectrochemical Water Oxidation by Cobalt Oxide/Silicon Photoanodes with Nanotextured Interfaces," J. Am. Chem. Soc. 2014, 136, 6191.
X. Zhou, R. Liu, K. Sun, K. M. Papadantonakis, B. S. Brunschwig, N. S. Lewis, "570 mV photovoltage, stabilized n-Si/CoOx heterojunction photoanodes fabricated using atomic layer deposition," Energy Environ. Sci. 2016, 9, 892.
J. Yang, J. K. Cooper, F. M. Toma, K. A. Walczak, M. Favaro, J. W. Beeman, L. H. Hess, C. Wang, C. Zhu, S. Gul, J. Yano, C. Kisielowski, A. Schwartzberg, I. D. Sharp, "A multifunctional biphasic water splitting catalyst tailored for integration with high-performance semiconductor photoanodes," Nat. Mater. 16, 335-341 (2017).
K. Sun, R. Liu, Y. Chen, E. Verlage, N. S. Lewis, C. Xiang, "A Stabilized, Intrinsically Safe, 10% Efficient, Solar-Driven Water-Splitting Cell Incorporating Earth-Abundant Electrocatalysts with Steady-State pH Gradients and Product Separation Enabled by a Bipolar Membrane," Adv. Energy Mater. 2016, 6, 1600379.
S. Y. Chen, L. W. Wang, "Thermodynamic Oxidation and Reduction Potentials of Photocatalytic Semiconductors in Aqueous Solution," Chem. Mater. 2012, 24, 3659.
F. M. Toma, J. K. Cooper, V. Kunzelmann, M. T. McDowell, J. Yu, D. M. Larson, N. J. Borys, C. Abelyan, J. W. Beeman, K. M. Yu, J. Yang, L. Chen, M. R. Shaner, F. A. Houle, K. A. Persson, I. D. Sharp, "Mechanistic insights into chemical and photochemical transformations of bismuth vanadate photoanodes," Nat. Commun. 2016, 7, 12012.
K. A. Walczak, G. Segev, D. M. Larson, J. W. Beeman, F. A. Houle, I. D. Sharp, "Hybrid Composite Coatings for Durable and Efficient Solar Hydrogen Generation under Diverse Operating Conditions," Adv. Energy Mater. 2017, 1602791.
International Search Report and Written Opinion for International Application No. PCT/US2017/040674 dated Oct. 18, 2017.

* cited by examiner

SOLAR FUEL GENERATOR INCLUDING A CATALYTIC MESH

RELATED APPLICATIONS

This application is a continuation of International Application No. PCT/US17/40674, filed Jul. 5, 2017, which claims priority to U.S. Provisional Patent Application Ser. No. 62/365,334, filed Jul. 21, 2016, both of which are herein incorporated by reference.

STATEMENT OF GOVERNMENT SUPPORT

This invention was made with government support under Contract No. DE-AC02-05CH11231 awarded by the U.S. Department of Energy and under Award No. DE-SC0004993 awarded by the U.S. Department of Energy. The government has certain rights in this invention.

TECHNICAL FIELD

This disclosure relates generally to a solar fuel generator and more particularly to a catalytic mesh for a solar fuel generator.

BACKGROUND

Since the first demonstration of photoelectrochemical water splitting, significant progress has been made in demonstrating high-efficiency, solar-driven hydrogen generators using various architectures and materials combinations. Additional demonstrations have incorporated novel materials, designs, and corrosion protection schemes. While energy conversion efficiency is an important characteristic of such devices, recent prospective lifecycle assessments and technoeconomic analyses have highlighted that device lifetime is also a critical consideration for a viable technology. Efficiency is affected by the combinations of materials used, the operational electrochemical environment, and the physical arrangement of the components within the device. Lifetime is affected by the stability of materials during active and inactive periods in contact with electrolyte, which are defined by photoelectrochemical and electrochemical properties of the materials, respectively, as well as the presence of defects over various length scales. In addition, safe operation requires separation of hydrogen and oxygen products to ensure explosive gas mixtures are not generated at any location in the device. Simultaneously achieving high efficiency, long lifetime, and pure gas product streams is a challenge to realizing useful device performance characteristics.

SUMMARY

One innovative aspect of the subject matter described in this disclosure can be implemented in a device including a photovoltaic cell, the photovoltaic cell having a first surface and a second surface, a mesh disposed on the first surface of the photovoltaic cell, and a polymer disposed on the mesh and on the first surface of the photovoltaic cell. The mesh has a catalyst disposed thereon. The polymer covers the first surface of the photovoltaic cell, with at least a portion of the mesh not being covered with the polymer.

Another innovative aspect of the subject matter described in this disclosure can be implemented in a method including providing a photovoltaic cell, contacting a mesh to a first surface of the photovoltaic cell, applying pressure to the mesh to hold it against the first surface of the photovoltaic cell, depositing a polymer on the mesh while the pressure is applied to the mesh, at least a portion of the mesh not being covered with the polymer, and curing the polymer while the pressure is applied to the mesh.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
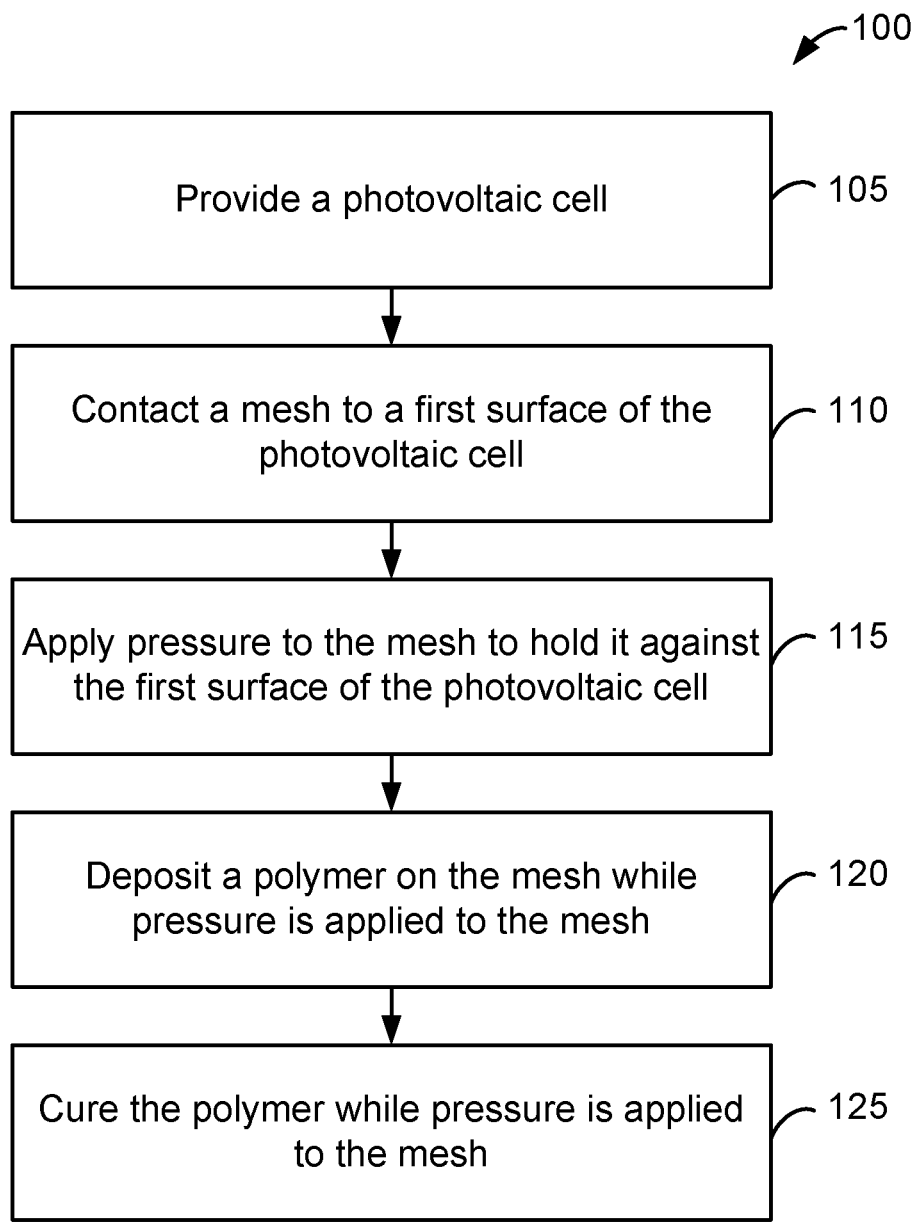
FIG. 1 shows an example of a flow diagram illustrating a manufacturing process for a solar fuel generator.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well-known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

Steady state solar-to-hydrogen (STH) conversion efficiency is increased by operation of solar water splitting devices under extreme pH conditions. Relative to near-neutral pH, acidic or alkaline conditions minimize catalytic overpotential requirements and mass transport limitations to the electrode surface, thereby leading to reduced solution resistance (i.e., current-resistance product, IR) losses and pH swings at electrode surfaces. However, the majority of semiconductor light absorber materials that have bandgaps in the optimum range for harvesting sunlight are not stable under these conditions. Such chemically sensitive materials can be protected by introduction of optically transparent, electrically conducting, and chemically inert layers at the semiconductor/electrolyte interface. These conformal thin films are typically grown by techniques such as atomic layer deposition (ALD), physical vapor deposition, or photoelectrochemical self-passivation, followed by growth of a catalyst layer. Alternatively, the catalyst can itself serve as the protection layer, such as for the case of thin films of $NiO_x$ or $CoO_x$. Regardless of approach, these layers stabilize the efficiency and increase the lifetime of the photoelectrode, while minimizing optical, electrical, and catalytic losses. In practice, the creation of semiconductor/protection layer/catalyst assemblies, with each material and interface possessing optimized chemical and electronic properties and having no defects through which the electrolyte can penetrate, remains a challenge.

Corrosion protection layers have been applied to devices capable of light-driven overall water splitting with no external applied bias. For example, high-efficiency tandem III-V semiconductor devices, with an illuminated photoanode and a dark cathode, were stabilized by ALD of TiO on the surface of the photoanode. These devices included membranes for product separation and exhibited lifetimes as long as 80 hours, but with steadily declining efficiencies beyond about 24 hours. The requirement for no defects in the protection layer restricted the total photoelectrode surface area to less than 1 $mm^2$.

Operation of a similar device using the same semiconductor stack and a bipolar membrane, with the photoanode exposed to near-neutral pH electrolyte and dark cathode exposed to pH 0 acid, yielded long lifetimes with larger surface areas. However, the use of bipolar membranes introduces a separate set of challenges for optimized device design, intermittent operation, and scale-up.

In another example, an in situ photocathode passivation method was applied to a tandem III-V cell in a configuration with no membrane to achieve an STH efficiency of 14%. This method improved stability via control of the semiconductor/electrolyte interface, but introduced some complexity for subsequent incorporation of the reduction reaction catalyst. Moreover, many useful semiconductor electrode materials cannot self-passivate, so the utility of this approach is limited to select semiconductor compositions.

The value of ALD as a protective coating method is that it is conformal and, when process conditions favor dense, uniform surface coverages, leads to high-quality films. In practice, such conditions are difficult to achieve, particularly as device dimensions are increased.

Organic thin films with in situ crosslinking can form transparent, dense, and conformal coatings that are stable in the presence of acid or base. If provided with conducting pathways to connect the semiconductor to the catalyst, such protection layers offer an alternative for semiconductor systems that do not require a liquid junction, cannot self-passivate, and are readily corroded. The utility of this alternative protection system for spontaneous, solar-driven water splitting devices is described herein.

Instead of depositing inorganic thin-film passivation layers and placing oxidation or reduction catalysts on them, placing a catalyst on a conducting mesh or grid support in intimate contact with the top surface of the bare electrode and embedding the assembly in a transparent polymer leads to both high efficiency and long lifetimes. This new architecture protects the photovoltaic (PV) from the harsh aqueous electrolyte operating environment, and allows direct charge transfer from the PV to the catalyst in contact with the liquid for efficient conversion of visible light to $H_2$ and $O_2$.

This method and assembly offers a number of advantages, including operation at both pH 0 and pH 14 and stability with respect to diurnal cycling and operation outdoors. This approach also provides flexibility in the selection of materials and their processing conditions since the device components are prepared separately and integrated as a final step. This assembly has been demonstrated to operate routinely for spontaneous light-driven water splitting at an STH efficiency of greater than 10% over days, with opportunity for further optimization, particularly with respect to the PV element. The fabrication method also offers a potentially highly manufacturable path for practical large-scale solar fuels devices.

FIG. 1 shows an example of a flow diagram illustrating a manufacturing process for a solar fuel generator. FIGS. 2A-2D show examples of schematic illustrations of a solar fuel generator at various stages in the manufacturing process.

Starting at block 105 of the process 100, a photovoltaic cell is provided. A photovoltaic cell generates a photovoltage and an electrical current. Generally, the photovoltaic cell comprises a semiconductor or semiconductors. In some embodiments, the photovoltaic cell comprises a multi-junction photovoltaic cell (e.g., a triple-junction photovoltaic cell or a double-junction photovoltaic cell). For example, in some embodiments, a triple junction photovoltaic cell comprises a layer of Ge, a layer of GaAs disposed on the layer of Ge, and a layer of InGaP disposed on the layer of GaAs. In some embodiments, the photovoltaic cell comprises a single junction photovoltaic cell. For example, a single junction photovoltaic cell may comprise crystalline or amorphous materials such as silicon (Si), CdTe, or GaAs.

In some embodiments, the photovoltaic cell is positioned in a frame, chassis, or an inset or recessed region of a substrate during the process 100. For example, the photovoltaic cell may be positioned in a frame after block 105. In some embodiments, the frame is an acrylic frame. The frame may serve to help align the components of the photovoltaic cell during the process 100. Further, when the photovoltaic cell is positioned in a recessed region of a substrate, the recessed region of the substrate may aid in the deposition of a specific amount of a polymer at block 120. For example, an amount of the polymer may be deposited to fill the recess in the substrate.

Figure 2A:
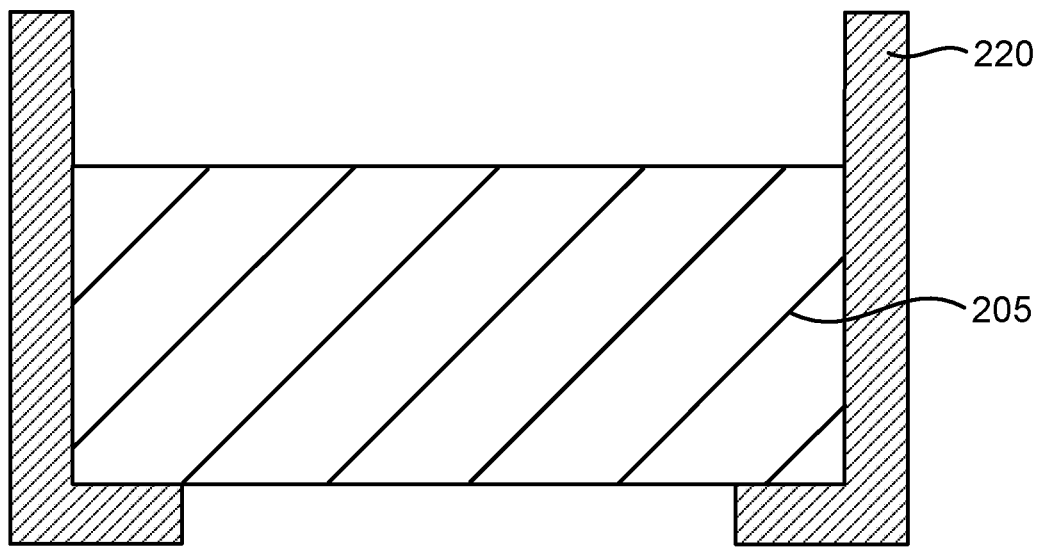
FIGS. 2A-2D show examples of cross-sectional schematic illustrations of a solar fuel generator at various stages in the manufacturing process.

FIG. 2A shows an example of a schematic illustrations of the partially fabricated solar fuel generator at this point (e.g., up through block 105) in the process 100. As shown in FIG. 2A, the solar fuel generator comprises a photovoltaic cell 205. The photovoltaic cell is positioned in a frame 220.

At block 110, a mesh is placed in contact with or contacted to a first surface of the photovoltaic cell. The mesh is structure that supports the catalyst and provides electrical conduction path between the photovoltaic, catalyst, and electrolyte. In some embodiments, the mesh comprises electrical conductors, electrical non-conductors, or combinations thereof. In some embodiments, the mesh comprises a single material or a laminate of multiple materials. In some embodiments, the mesh is a metal mesh. For example, the mesh may comprise titanium, nickel, carbon, or stainless steel. In some embodiments, the mesh comprises a catalytic metal (e.g., platinum or palladium). In some embodiments, the mesh has an optical transmittance of about 50% to 99%, about 65% to 95%, or about 70% to 90%. In some embodiments, the mesh is micro-textured or nano-textured.

Figure 3A:
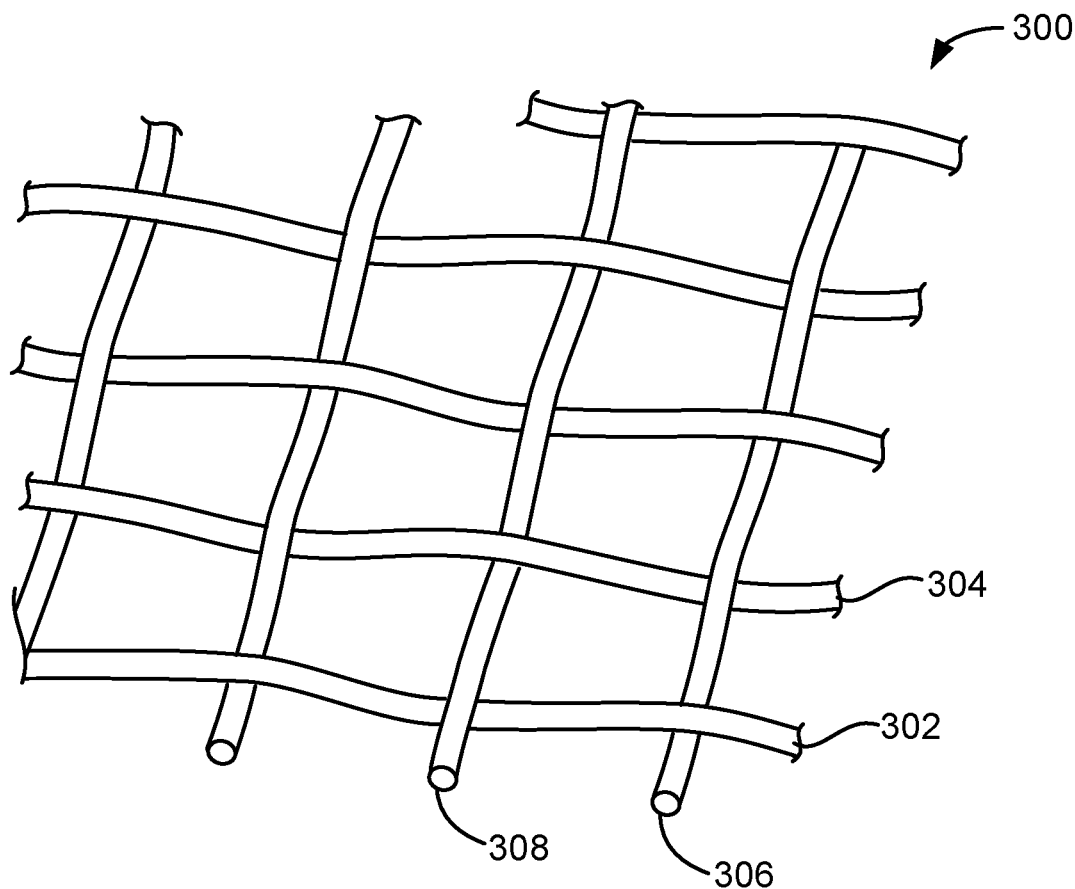
FIGS. 3A and 3B show examples of schematic illustrations of a mesh.
Figure 3B:
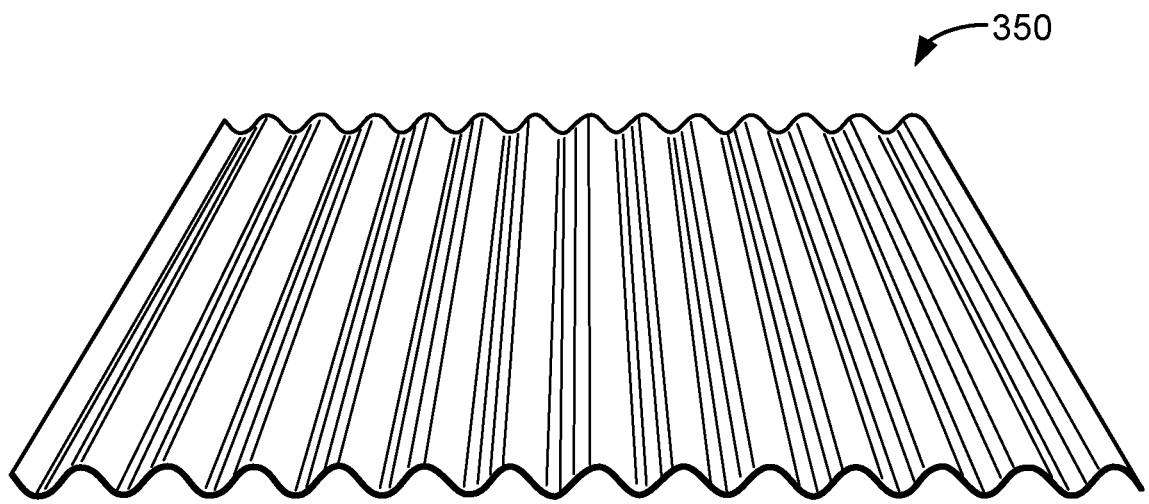

In some embodiments, a mechanical cross-sectional structure of the mesh is solid, hollow, porous, or braided. FIGS. 3A and 3B show examples of schematic illustrations of a mesh. As shown in FIG. 3A, in some embodiments, the mesh comprises a wire mesh or a wire grid. Examples of wire meshes include screens for windows or doors and strainers for use in cooking. The wire mesh 300 includes a first set of wires (wires 302 and 304) that are substantially parallel to one another and a second set of wires (wires 306 and 308) that are substantially parallel to one another. The first set of wires is substantially perpendicular to a second set of wires, with the first set being woven with the second set. Other geometries of wire meshes can also be used. For example, some wire meshes may include three sets of wires with wires in each set being substantially parallel to one another. The three sets of wire may be woven together, with the three sets of wire not necessarily being substantially perpendicular to one another.

In some embodiments, wires of the wire mesh have a diameter of about 0.10 millimeters (mm) to 0.5 mm, or about 0.3 mm. In some embodiments, there are about 10 wires to 30 wires, or about 20 wires, that are positioned substantially parallel to one another along a distance of about 1 inch. In some embodiments, a pitch (i.e., a distance between two adjacent parallel wires) of the wire mesh is about 0.2 mm to 1 mm. However, pitches and wire diameters may be specified for a photovoltaic and/or a catalyst.

As shown in FIG. 3B, in some embodiments, the mesh comprises a corrugated sheet 350. The corrugated sheet 350 has holes (not shown) defined in it. A corrugated sheet is planar sheet that has been shaped into alternate ridges and grooves. For example, in cross-section, a corrugated sheet may appear to be sine wave. In general, the density, shape, and size of the holes increases or maximizes light transmission through the corrugated sheet, reduces or eliminates product accumulation, increases or maximizes catalytic loading, and reduces infrared losses. In some embodiments, the sheet is about 100 microns to 300 microns thick. The holes also may be of any shape. In some embodiments, the holes are circular or substantially circular. In some embodiments, the holes defined in the corrugated sheet have a dimension or a diameter of about 100 microns to 1000 microns. In some embodiments, there are about 5 holes to 500 holes per square inch defined in the corrugated sheet. In some embodiments, a density of holes is variable across the corrugated sheet.

In some embodiments, the method 100 includes depositing a catalyst on the mesh. In some embodiments, the catalyst is deposited on the mesh prior to block 110. In some embodiments, the catalyst is deposited on the mesh using a physical vapor deposition technique, such as sputtering, for example. In some embodiments, the catalyst is deposited on the mesh using electrodeposition, electroless deposition, anodic deposition, cathodic deposition, spray coating, atomic layer deposition, or chemical vapor deposition. In some embodiments, the catalyst comprises a hydrogen evolving catalyst. For example, in some embodiments, the catalyst is selected from a group consisting of copper (Cu), platinum (Pt), palladium (Pd), and a nickel molybdenum (NiMo) alloy. In some embodiments, the catalyst comprises an oxygen evolving catalyst. For example, in some embodiments, the catalyst is selected from a group consisting of iridium (Ir), iridium oxide, nickel oxide, iron oxide, cobalt oxide, and combinations thereof. In some embodiments, the catalyst comprises a carbon dioxide reduction catalyst or a nitrogen reduction catalyst.

Figure 2B:
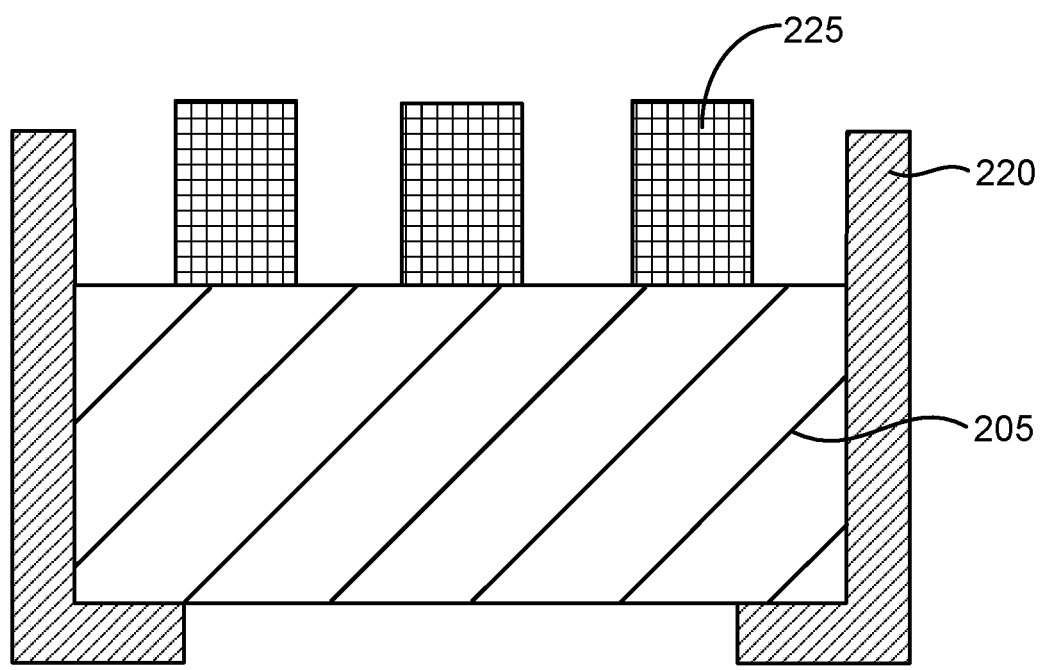

FIG. 2B shows an example of a schematic illustrations of the partially fabricated solar fuel generator at this point (e.g., up through block 110) in the process 100. As shown in FIG. 2B, a mesh 225 is in contact with a first surface of the photovoltaic cell 205.

Returning to FIG. 1, at block 115, pressure is applied to the mesh to hold it against the first surface of the photovoltaic cell. The purpose of applying pressure to the mesh is to aid in ensuring that the mesh remains in contact with the first surface of the photovoltaic cell during operations in blocks 120 and 125 in the process 100, as described below. In some embodiments, the pressure is applied to the mesh at blocks 115, 120 and 125 in the process 100.

In some embodiments, pressure is applied to the mesh with a fixture. In some embodiment, the fixture includes a plurality of post attached to a substrate. FIG. 2E shows an example of a fixture. As shown in FIG. 2E, a fixture 290 includes a surface 291 with four posts 292 attached to the surface 291. For example, the fixture may be similar to a small table or a small stool. In some embodiments, the surface 291 defines an opening 293 to provide further access to the mesh at block 120 and 125.

Returning to FIG. 1, at block 120, a polymer is deposited on the mesh while pressure is applied to the mesh. At least a portion of the mesh is not covered with the polymer. In some embodiments, the polymer is a thermosetting polymer. A thermosetting polymer comprises a resin that is in a soft solid or viscous liquid state that changes irreversibly into an insoluble polymer network by curing. In some embodiments, the polymer comprises an optically transparent polymer or a substantially optically transparent polymer. In some embodiments, the polymer comprises an epoxy, a phenol formaldehyde resin (e.g., a novolac phenol formaldehyde resin), a fluoropolymer, or a cyclic olefin copolymer.

Figure 2C:
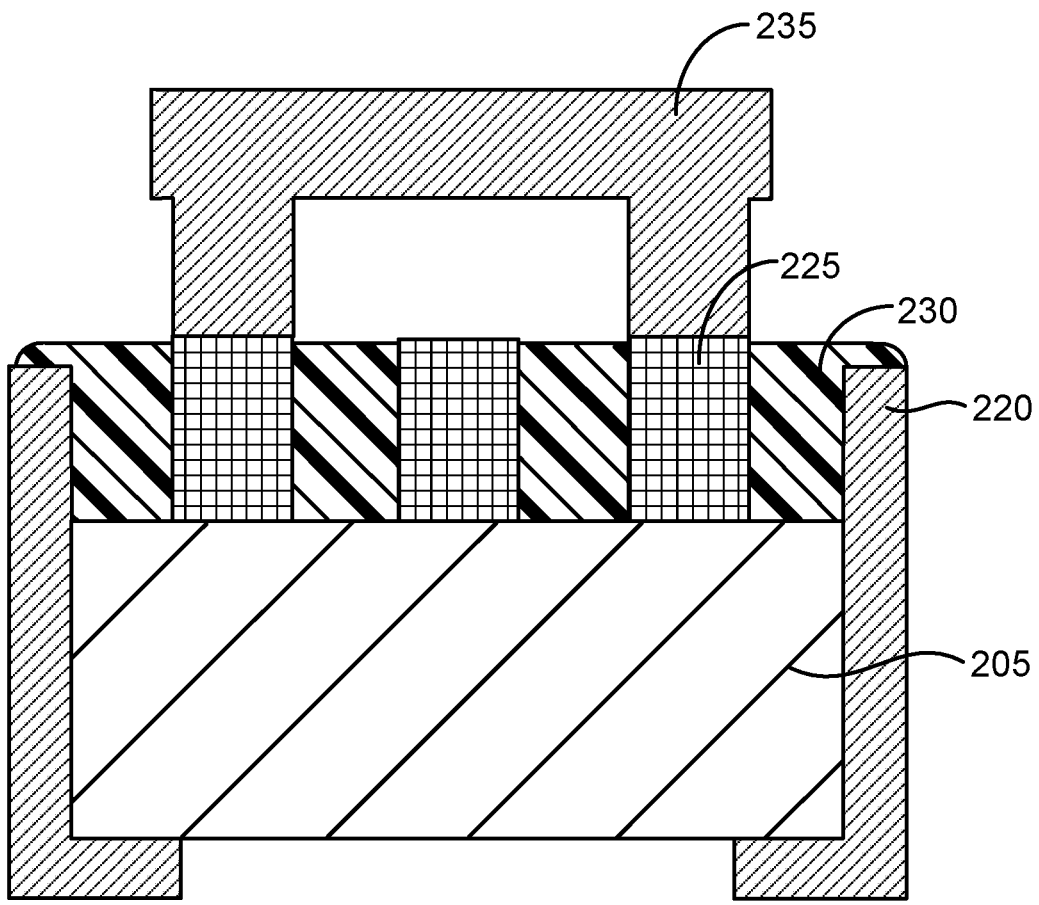

FIG. 2C shows an example of a schematic illustrations of the partially fabricated solar fuel generator at this point (e.g., up through block 120) in the process 100 with pressure being applied to the mesh. In the embodiment shown in FIG. 2C, pressure is applied to the mesh 225 in contact with the first surface of the photovoltaic cell 205 with a fixture 235. A polymer 230 has been deposited on the mesh 225 and the photovoltaic cell 205. Portions of the mesh 225 do not have the polymer 230 disposed thereon.

At block 125, the polymer is cured while pressure is applied to the mesh. In some embodiments, a thermosetting polymer is cured by allowing a period of time to elapse. For example, some epoxies cure in this manner. In some embodiments, a thermosetting polymer is cured by exposing the thermosetting polymer to heat. For example, in some embodiments, a thermosetting polymer is exposed to a temperature of about 25° C. to 85° C., or about 55° C., for about 6 hours to 18 hours, or about 12 hours. In some embodiments, a thermosetting polymer is cured by exposing the thermosetting polymer to ultraviolet light.

Figure 2D:
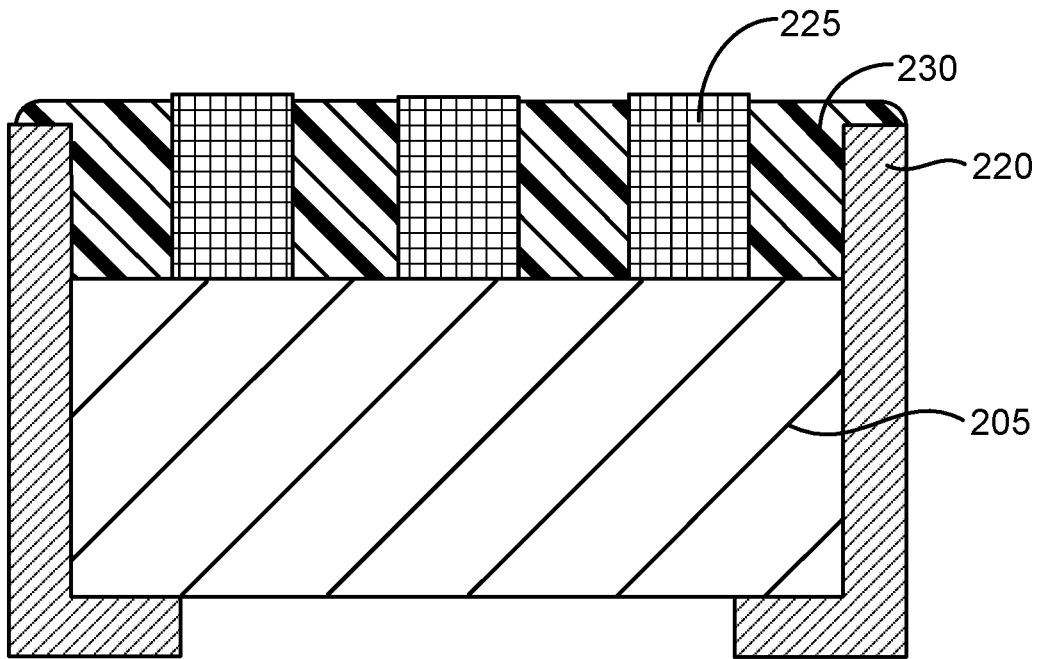
Figure 2E:
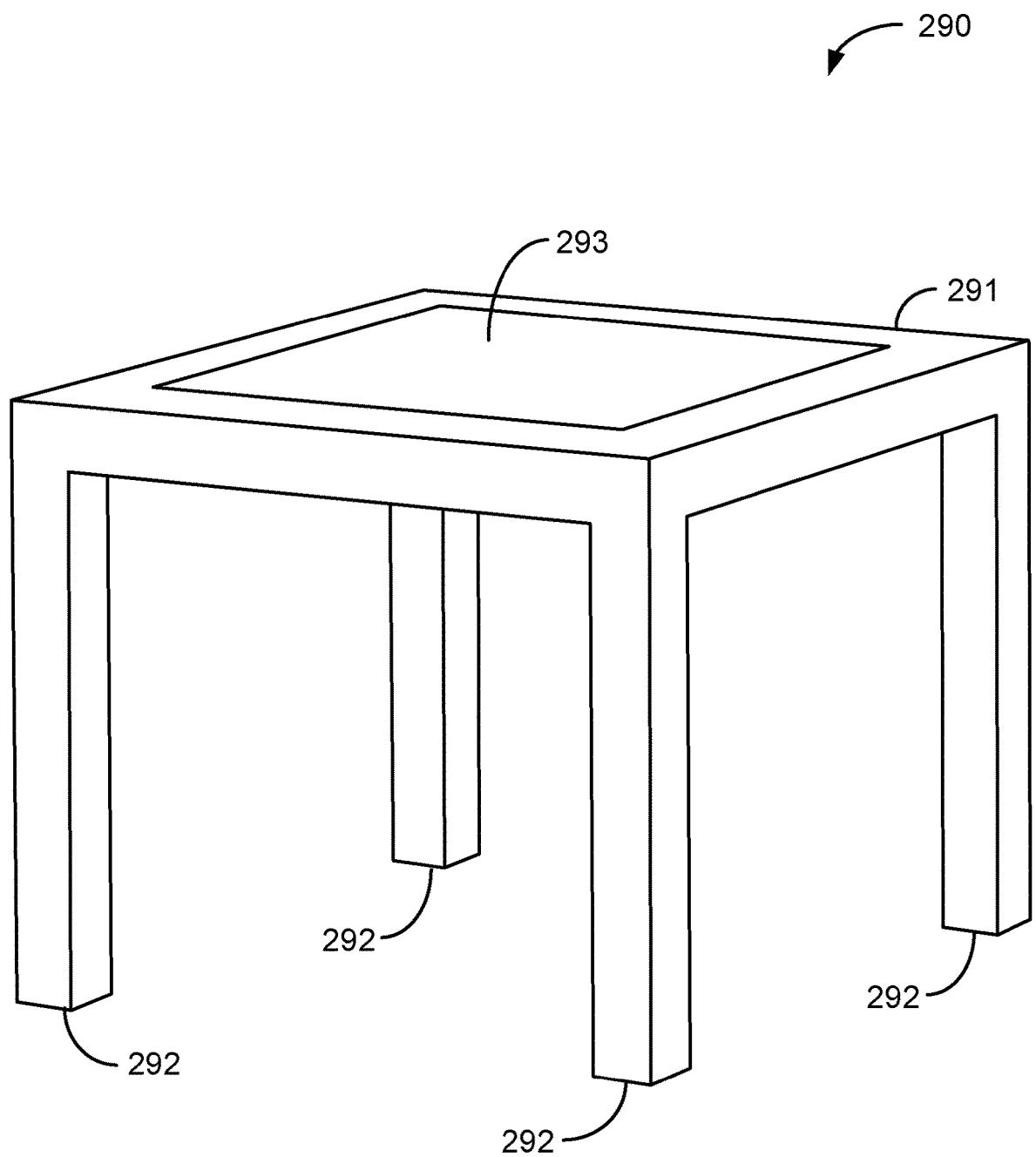
FIG. 2E shows an example of a fixture.

FIG. 2D shows an example of a schematic illustrations of the partially fabricated solar fuel generator after block 125 in the process 100 with the application of pressure having been removed. The solar fuel generator includes the photovoltaic cell 205 with a wire mesh 225 in contact with the first surface of the photovoltaic cell 205. A polymer 230 that has been cured is in contact with the mesh 225 and the first surface of the photovoltaic cell 205. Portions of the mesh 225 do not have the polymer 230 disposed thereon.

In some embodiments, prior to block 120, the polymer is degassed. For example, the polymer may be placed in a vacuum chamber (e.g., $150 \times 10^{-3}$ torr for 5 minutes) to degas the polymer. Degassing the polymer prior to depositing it on the mesh and the first surface of the photovoltaic cell may aid in obtaining a cured polymer with a high optical transmission due to few or no bubbles being in the cured polymer.

In some embodiments, a catalyst is deposited on the exposed portions of the mesh (i.e., portions of the mesh not having the polymer disposed thereon) after block 125. In some embodiments, this is accomplished with electrodeposition (e.g., photo-assisted electrodeposition). Depositing the catalyst on the mesh in this manner can save costs, as the catalyst will only be disposed the exposed, active, portions of the mesh and not on portions of the mesh in contact with the photovoltaic cell or the polymer. In some embodiments, a voltage applied to the mesh during the electrodeposition process may allow for better control of the catalyst deposition process. In some embodiments, the catalyst is deposited on the mesh using electroless deposition, anodic deposition, cathodic deposition, spray coating, atomic layer deposition, or chemical vapor deposition.

In some embodiments, prior to block 110, concavity is imparted to a first surface of the mesh. The first surface of the mesh is contacted to the first surface of the photovoltaic cell at block 110 and then pressure is applied to the mesh at block 115. Concavity may be imparted to a first surface of the mesh by bending the mesh. Imparting concavity to the mesh may aid in ensuring that a large or maximum amount of the surface of the mesh is in contact with the first surface of the photovoltaic cell.

Figure 2F:
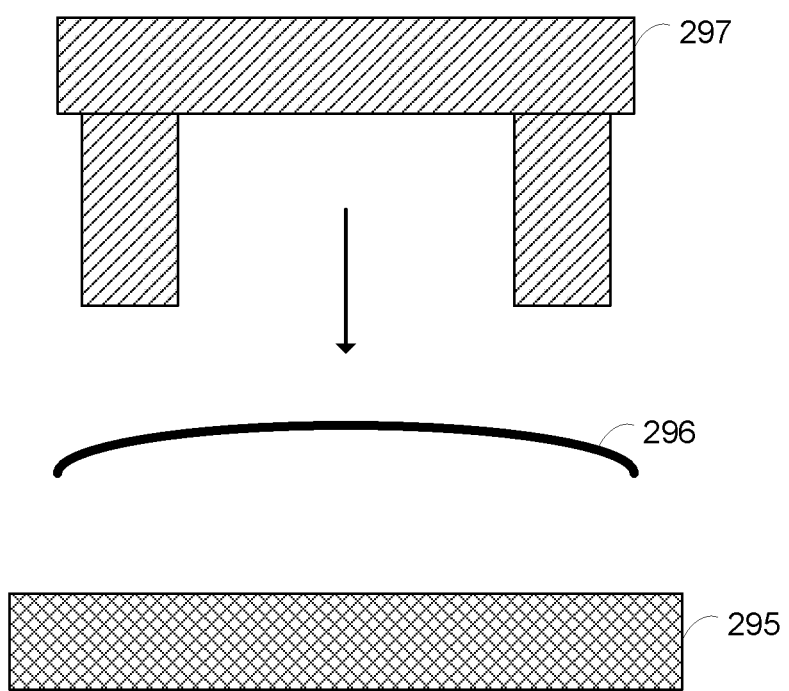
FIG. 2F shows an example of a cross-sectional schematic illustration of a fixture being used to apply pressure to a mesh with a concave surface of the mesh pressed against a first surface of a photovoltaic cell.

FIG. 2F shows an example of a cross-sectional schematic illustration of a fixture being used to apply pressure to a mesh with a concave surface of the mesh pressed against a first surface of a photovoltaic cell. As shown in FIG. 2F, a mesh 296 will have pressure applied to it with a fixture 297 to hold the mesh against a surface of the photovoltaic cell 295. The surface of the mesh 296 that will be contacted to the surface of the photovoltaic cell 295 is concave.

Figure 4A:
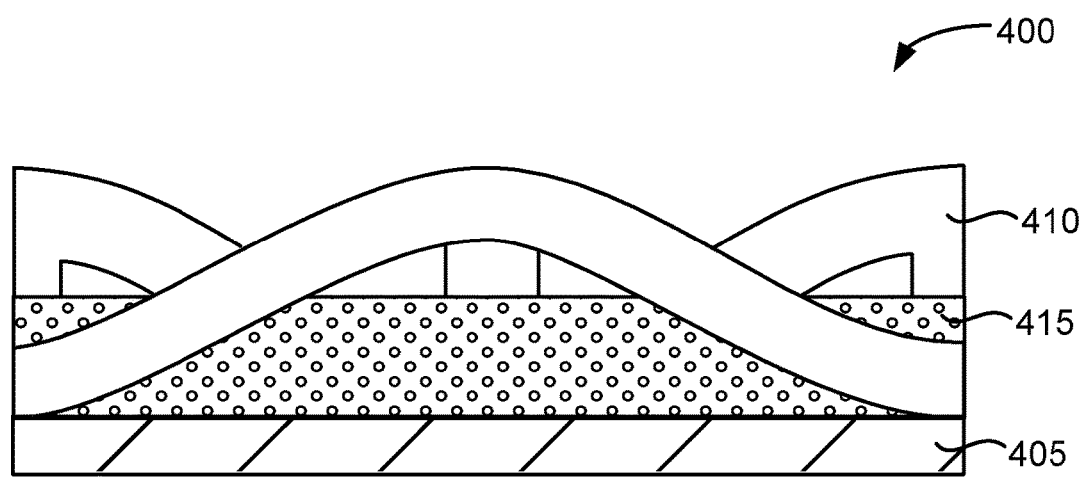
FIGS. 4A and 4B show examples of cross-sectional schematic illustrations of a solar fuel generator.

FIG. 4A shows an example of a cross-sectional schematic illustration of a solar fuel generator. As shown in FIG. 4A, the solar fuel generator 400 comprises a photovoltaic cell 405 and a wire mesh 410 in contact with a surface of the photovoltaic cell 405. A polymer 415 is disposed on the surface of the photovoltaic cell 405 and the wire mesh 410. At least a portion of the wire mesh 410 does not have the polymer 415 disposed thereon. The portion of the wire mesh 410 that does not have the polymer 415 disposed thereon is the portion the furthest distance from the surface of the photovoltaic cell 410 due to the weave of the wire mesh 410. In some embodiments, a thickness of the polymer 415 (e.g., the thickness of the polymer, measured from the surface of the photovoltaic cell) is about 50 microns to 350 microns. The thickness of the polymer 415 will depend in part on the type of polymer used. For example, to reduce or minimize reflection losses, the thickness of the polymer 415 may depend on an index of refraction of the polymer. In some embodiments, a solar fuel generator includes a wire (not shown) in contact with the mesh. The wire (e.g., a metal wire) can allow for electrical contact with the mesh at an edge of the solar fuel generator.

Figure 4B:
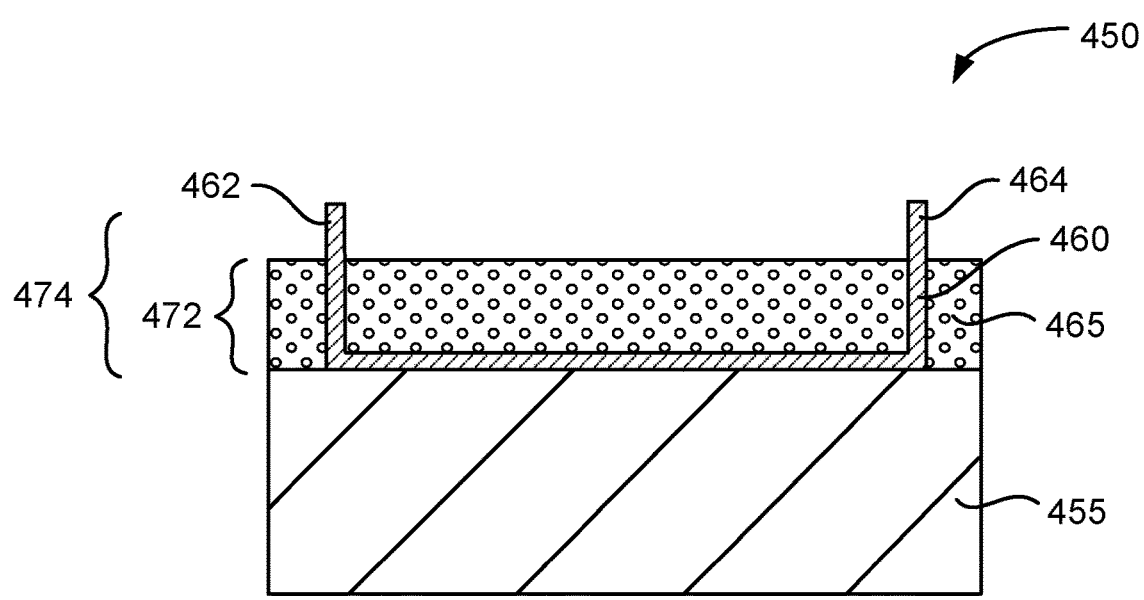

FIG. 4B shows an example of a cross-sectional schematic illustration of a solar fuel generator. As shown in FIG. 4B, the solar fuel generator 450 comprises a photovoltaic cell 455 and a mesh 460 in contact with a surface of the photovoltaic cell 455. The mesh 460 is bent on two of its edges, forming an elongated "C" in cross-section. A polymer 465 is disposed on the surface of the photovoltaic cell 455 and the mesh 460. A portion of the two edges 462 and 464 of the mesh 460 do not have the polymer disposed thereon. In some embodiments, a thickness 472 of the polymer 465 (e.g., the thickness of the polymer, measured from the surface of the photovoltaic cell) is about 50 microns to 2 mm or about 50 microns to 350 microns. In some embodiments, a length 474 of each of the edges 462 and 464 is about 100 microns to 3 mm or about 100 microns to 400 microns. In some embodiments, a length of each of the portions of the two edges 462 and 464 of the mesh 460 that do not have the polymer disposed thereon is about 10 microns to 1 mm or about 10 microns to 50 microns. In some embodiments, when the photovoltaic cell 450 is square or rectangular (i.e., in a top-down view), the mesh is bent on four edges (e.g., forming a shallow pan-type structure).

When the solar fuel generator 400 as shown in FIG. 4A is in operation, gas bubbles are generated at the exposed portions of the mesh 410. These gas bubbles can block light and reduce the transmission of the light to the photovoltaic cell 405. When the solar fuel generator 450 shown in FIG. 4B is in operation, gas bubbles are generated at the exposed portions of the mesh 460. As the portions of the two edges 462 and 464 are not covered with the polymer 465, gas is generated only at the two edges 462 and 464. As gas is generated at the two edges 462 and 464, the majority of the surface of the photovoltaic cell 455 does not have gas bubbles blocking sunlight impinging on the photovoltaic cell 455. Due to the bubbles not blocking sunlight along the entire surface of the photovoltaic cell 455 of the solar fuel generator 450, the solar fuel generator 450 may exhibit better performance than the solar fuel generator 400.

Figure 5:
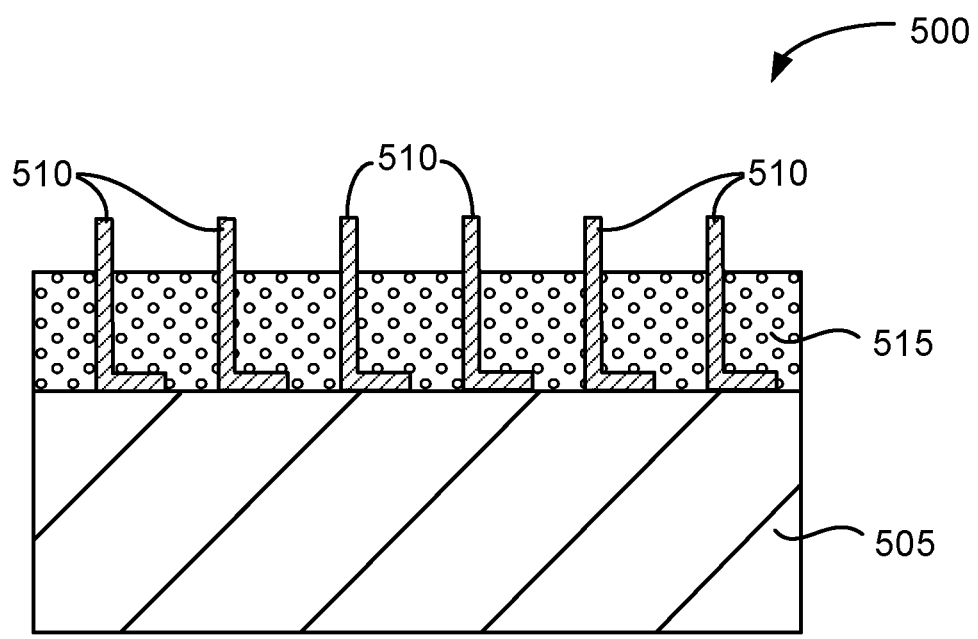
FIG. 5 shows an example of a cross-sectional schematic illustration of a solar fuel generator.

Other configurations of a solar fuel generator are also possible. FIG. 5 shows an example of a cross-sectional schematic illustration of a solar fuel generator. As shown in FIG. 5, a solar fuel generator 500 includes a photovoltaic cell 505 and a plurality of meshes 510 in contact with a surface of the photovoltaic cell 505. Each of the meshes 510 comprise a sheet of the mesh bent in an "L" shape. A polymer 515 is disposed on the surface of the photovoltaic cell 505 and the plurality of meshes 510. A least a portion of the each of the meshes 510 does not have the polymer 515 disposed thereon. In some embodiments, a wire or other electrical connection (not shown) electrically connects each of the plurality of meshes 510. In some embodiments, the "L" shaped structures comprise solid sheets of metal (i.e., the "L" shaped structures are not meshes).

The solar fuel generator 500 shown in FIG. 5 is similar to the solar fuel generator 450 shown in FIG. 4B. Due to some portions of the surface of the solar fuel generator 500 not being covered by a mesh, in some instances the solar fuel generator 500 may be more efficient than the solar fuel generator 450.

A basic solar-fuel generator contains photoabsorbers, electrocatalysts, a membrane separator (e.g., an ionomer), and electrolyte. Multiple photoelectrochemical processes take place during the operation of a solar-fuel generator: (i) light absorption in the semiconductor; (ii) charge generation, separation, and transport in the semiconductor; (iii) interfacial charge transfer between the semiconductor and the catalyst; (iv) catalytic fuel-forming reaction at the catalysts;

and (v) ionic and gas transport between the cathode and anode chamber. These processes are intimately coupled with each other and produce a single rate of reaction.

Figure 6:
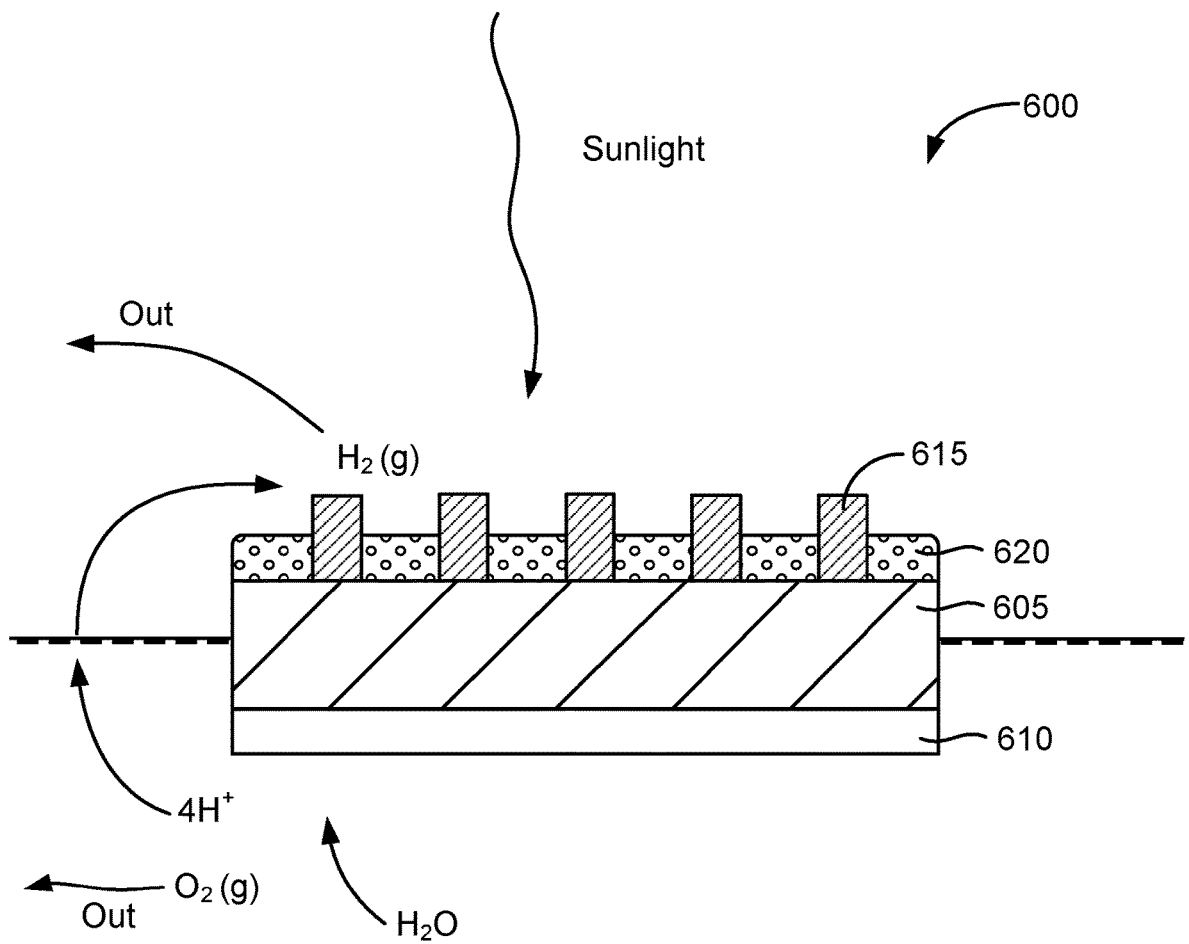
FIG. 6 shows an example of the operation of a hydrogen solar fuel generator.

FIG. 6 shows an example of the operation of a hydrogen solar fuel generator. Briefly, in the operation of a solar fuel generator 600, a photovoltaic cell 605 generates electrical current when light (e.g., sunlight) impinges on the photovoltaic cell 605. Water is split at an oxygen evolution catalyst 610. Hydrogen is generated at a hydrogen evolution catalyst 615. The hydrogen evolution catalyst 615 may be disposed on a mesh in contact with a surface of the photovoltaic cell 605, as described in the above-embodiments. A polymer 620 may be disposed on the surface of the photovoltaic cell 605 and portions of the mesh in order to protect the photovoltaic cell 605 from the electrolyte in the operational environment. The solar fuel generator 600 shown in FIG. 6 produces hydrogen. With different catalysts and electrolytes, a solar fuel generator can also be set up to reduce carbon dioxide ($CO_2$) to carbon monoxide (CO) and other more reduced compounds (e.g., alcohols and hydrocarbons), such as methane, ethanol, or ethylene, for example. With different catalysts and electrolytes, a solar fuel generator can also be set up to reduce nitrogen ($N_2$) to ammonia ($NH_3$)

EXAMPLE

The following examples are intended to be examples of the embodiments disclosed herein, and are not intended to be limiting.

To fabricate a solar fuel generator implementing the above-described embodiments (i.e., a catalytic mesh), a commercially available multi-junction photovoltaic (PV) element was used as the core of the device. Specifically, a triple-junction PV cell was used. The PV cell provided a suitable platform for characterizing stability and possesses illuminated current-voltage characteristics that could allow for solar-to-hydrogen (STH) conversion efficiencies of greater than 10% in a monolithic assembly. The architecture of the PV, which was based on a Ge bottom cell, GaAs middle cell, and InGaP top cell, drives photogenerated electrons to the illuminated front surface and holes to the back surface. When this PV is used for solar-driven water splitting, $H_2$ will be produced on the illuminated cathode and $O_2$ will be produced on the backside anode. The catalytic mesh will be in contact with the InGaP top cell of the PV. An oxygen catalyst (e.g., $NiFeO_x$ or $IrO_x$) will be disposed on the Ge bottom cell of the PV (i.e., the non-light absorbing side of the PV). However, it should be noted that there are also photovoltaics with the opposite polarity in which the anode is on the light absorbing side and the cathode is on the non-illuminated side such that oxygen would be produced on the illuminated side and hydrogen would be produced on the non-illuminated side.

The triple junction PV cells were diced into 1×1 $cm^2$ pieces and mounted into an acrylic chassis. The composite coating, which protects the PV element, allows charge transport, and provides catalytic activity, was fabricated on the surface of the mounted triple junction cell. A Pt-coated Ti mesh, which provides both electrical conductivity and activity for the hydrogen evolution reaction (HER), was prepared. The Ti mesh comprised 0.28 mm diameter wire woven into an 18 wire per inch mesh. The Ti grids were solvent-cleaned by sequential sonication in acetone and isopropanol, followed by drying under high purity $N_2$. Grids were then loaded into a 5-gun confocal sputtering system with a base pressure of $7\times10^{-7}$ Torr for catalyst deposition. The chamber was equipped with a Ti target, a Pt target, and an Ir target. For driving the hydrogen evolution reaction, Pt was selected as the catalyst and was deposited by radio frequency (rf) sputtering.

Prior to sputter deposition, the Ti meshes were cleaned by sputter etching at 25 Watts for 3 minutes in an Ar plasma at 5 mTorr. Immediately after this treatment, a 10 nm Ti adhesion layer was deposited onto the Ti mesh by rf sputtering at 3.7 W $cm^{-2}$ at a pressure of 2 mTorr in Ar. Finally, 100 nm of catalyst (Pt for HER or Ir for acidic OER) was deposited by rf sputtering in a 2 mTorr atmosphere of Ar, also at 3.7 W $cm^{-2}$. The sputtering sequences included a 1 minute overlap between Ti and catalyst deposition steps. These processes were performed for both sides of the meshes. For alkaline OER catalysis, NiFe was deposited onto the Ge bottom cell of the PV by co-sputtering Ni and Fe to give a 50:50 atomic ratio. All materials were sputtered at room temperature, and the deposition rates were determined using a quartz crystal monitor.

The Pt-coated Ti mesh was compressed against the surface of the PV cell. This mesh was then infilled by a novolac phenol-formaldehyde resin, which was selected as an optically transparent and chemically resistant epoxy, and was then cured. Specifically, the epoxy was prepared by weighing the two components to a weight ratio of 100:45, following by manual mixing for 1 minute. Next, the epoxy was degassed in a chamber evacuated to 150 mTorr for 5 minutes after which it was purged with nitrogen. To create the composite coating, the catalyst-coated wire grid was mechanically pressed against the surface of the photovoltaic element with a custom 2-point compression unit held in place with finger-tightened nuts on threaded support rods. The epoxy was then applied to the grid/photovoltaic assembly and cured in at 55° C. for 12 hours in air, after which it was cooled to room temperature.

Because there is no chemical bonding between the catalyst-coated mesh and the PV element, intimate physical contact between the two was maintained during curing of the epoxy by mechanically pressing the grid onto the light absorber. This ensured good electrical contact between components. High efficiency charge extraction from the PV was promoted by the presence of metallic strip contacts on the commercial devices. This efficiency is expected to be similar for other PV devices with doped top surface window layers or transparent conductive layers. For the present study, a Pt coating was selected as the HER catalyst because of its high activity and chemical stability at both high and low pH. Note that other catalysts could be integrated using the same approach; the primary requirement would be good adhesion between the catalyst and the electrically conductive mesh.

The epoxy physically separates the chemically sensitive semiconductor stack from the harsh aqueous environment required for photoelectrolysis. The grid used in these experiments was woven from metallic wires and the resulting 3D structure is beneficial for ensuring complete infilling of epoxy. Furthermore, this structure promotes protrusion of the catalyst-coated metallic grid above the surface of the epoxy to ensure formation of an interface between the catalyst and the electrolyte.

Since the photovoltaic element is illuminated through the composite coating, the optical properties of the epoxy and form factor of catalyst-coated grid have a direct impact on efficiency. The epoxy is characterized by high optical transmission across the visible spectral range and to wavelengths beyond the Ge bandgap in the infrared. This low optical loss, combined with chemical stability from low to high pH, makes this material well suited as a protective encapsulant in solar fuels devices. However, the Ti grid partially shadows the photovoltaic element. In these experiments, commercially available Ti wire grids that are 67.4% transmissive were used. The optical loss can be reduced or minimized by optimization of the 3D grid structure, providing an opportunity for improvement of STH efficiency.

The properties of this solar fuel generator were then tested, as described in K. A. Walczak, G. Segev, D. M. Larson, J. W. Beeman, F. A. Houle, I. D. Sharp, "Hybrid Composite Coatings for Durable and Efficient Solar Hydrogen Generation under Diverse Operating Conditions," Adv. Energy Mater. 2017, 1602791, which is herein incorporated by reference.

Although the assembled devices were characterized by high STH efficiency exceeding 10% and long-term durability under reaction conditions, the above-described experimental work also revealed a number of aspects of this architecture that can be improved. They fall into three main groups: light management, interfacial stability, and bubble management.

The fraction and wavelength distribution of incident light that is absorbed by the photovoltaic element is primarily controlled by: (i) the chemical composition of the epoxy, (ii) thickness of the epoxy, (iii) the reflectivity at the epoxy/PV and epoxy/electrolyte interfaces, (iv) the transparency of the mesh support, and (v) the detailed structure and compositions of the photovoltaic device, including the semiconductor materials stack, antireflection coatings, and contact layers. Transmission through the epoxy is high across the range of wavelengths absorbed by the triple junction device. However, the Ti mesh blocks over 30% of incident light across all wavelengths, indicating that efficiency could be improved by use of a fine gauge mesh. While this would complicate incorporation of the polymer to form a continuous composite, it is likely that a satisfactory fabrication method can be devised.

In addition, it is possible that long-term stability of the epoxy in illuminated and reactive environments may affect its transparency. Increasing opacity was not observed in the present work. However, operation times were short compared to those expected for the energy return of a practical system to be positive and yellowing or other changes that are typical of polymer degradation could occur over time. Possible (photo)chemical routes to epoxy degradation need to be identified and development of photostable compositions specifically engineered for application in artificial photosystems may be useful.

Optimization of the photovoltaic element provides opportunity for more efficient light harvesting and conversion to chemical product. In the above-described work, the goal was to use established and commercially available components in order to develop a robust, yet simple, approach to overcoming chemical and photochemical instability. Avalanche breakdown of the Ge bottom cell enabled STH efficiencies that were larger than anticipated given light absorption by water. However, it is important to note that the photovoltaic device was not optimized for either terrestrial applications or use in water. While an STH efficiency of greater than 10% was achieved in the present work, use of custom-designed tandem photovoltaic cells with bandgaps optimized by considering the real spectral irradiance in the operational environment would yield performance improvements. Ideally, such designs would consider not just transmission through the electrolyte, but also optical filtering by the polymer component of the composite protection layer, as well as potential benefits of integrated antireflection coatings.

The stability of several key interfaces requires careful management. The cleaning and surface preparation processes used the fabrication of the above-described devices were developed to ensure good coating uniformity and adhesion between the PV, wire mesh, and epoxy. This was needed for preventing penetration of electrolyte into the assembly, which would result in rapid chemical attack of the triple junction cell and device failure. However, gradual degradation of device performance was observed after 5 days of testing under simulated diurnal cycling. It was determined that the origin of this photocurrent decline was loss of catalyst from the grid surface, likely as a consequence of stress corrosion cracking. Deposition of thin metallic adhesive interlayers, control of catalyst film microstructure and stress, and elimination of interfacial oxides susceptible to penetration by electrolyte are all possible routes to avoiding catalyst loss by this mechanism and improving durability.

Nucleation and growth of large, anchored bubbles was commonly found during experiments performed with the devices. This indicates that the unstirred electrolyte/device interface was unfavorable for rapid detachment of small bubbles. The presence of bubbles results in light scattering that can affect the intensity and wavelength distribution of light available to be absorbed. Furthermore, their presence reduces the solid/liquid contact area, thereby reducing the concentration of available catalytic centers. Careful management of surface energies using stable chemistries may help promote bubble detachment from surfaces, which would improve the time-averaged product generation rate.

The usefulness of the architecture described herein depends not only on these paths to improvement but also on amenability to scaling to surface areas of practical size. In this work, the PV element was kept to 1 cm$^2$, but there do not appear to be limitations to using the same approach to fabricate much larger devices. This is in contrast to other corrosion protection approaches that are dependent on the controlled deposition of thin films, often using energy-intensive vacuum processing. Extension of those approaches to larger scales will require migration to larger tooling and development of new processes to manage film homogeneity and defects in these complex materials systems. The potential for facile scaling of the composite protection strategy presented here represents an important advantage in the quest for practical solar water splitting devices and, ultimately, solar fuels generators.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A solar fuel generator comprising:
    a photovoltaic element, the photovoltaic element operable to generate a photovoltage and an electrical current and having a first surface and a second surface, an oxygen evolving catalyst disposed over the second surface;
    a mesh disposed on and in contact with the first surface of the photovoltaic element, the mesh being electrically conductive and having a catalyst disposed thereon; and a polymer disposed on and in contact with the mesh and disposed on and in contact with the first surface of the photovoltaic element, the polymer covering the first surface of the photovoltaic element, at least a portion of the mesh not having the polymer disposed thereon to allow for contact of the catalyst disposed on the mesh with an aqueous electrolyte, and the polymer preventing contact between the first surface of the photovoltaic element and the aqueous electrolyte.

2. The solar fuel generator of claim 1, wherein the catalyst is selected from a group consisting of a hydrogen evolving catalyst, a carbon dioxide reduction catalyst, and a nitrogen reduction catalyst.

3. The solar fuel generator of claim 1, wherein the catalyst is selected from a group consisting of copper, platinum, palladium, and a nickel molybdenum alloy.

4. The solar fuel generator of claim 1, wherein the polymer comprises an optically transparent polymer.

5. The solar fuel generator of claim 1, wherein the mesh comprises a wire mesh.

6. The solar fuel generator of claim 1, wherein the mesh has an optical transmittance of about 65% to 95%.

7. The solar fuel generator of claim 1, wherein the photovoltaic element comprises a multi-junction photovoltaic element comprising three or more different semiconductor materials.

8. The solar fuel generator of claim 1, wherein the photovoltaic element comprises a single junction photovoltaic element comprising two different semiconductor materials.

9. The solar fuel generator of claim 1, wherein the polymer comprises a thermosetting polymer.

10. The solar fuel generator of claim 1, wherein the polymer is selected from a group consisting of an epoxy, a phenol formaldehyde resin, a fluoropolymer, and a cyclic olefin copolymer.

11. A method for fabricating a solar fuel generator comprising:
(a) providing a photovoltaic element operable to generate a photovoltage and an electrical current;
(b) contacting a mesh to a first surface of the photovoltaic element, the mesh being electrically conductive;
(c) applying pressure to the mesh to hold it against the first surface of the photovoltaic element;
(d) depositing a polymer on the mesh while the pressure is applied to the mesh; and
(e) curing the polymer while the pressure is applied to the mesh, the resulting solar fuel generator comprising:
the photovoltaic element, the photovoltaic element having a second surface, and an oxygen evolving catalyst disposed over the second surface;
the mesh disposed on and in contact with the first surface of the photovoltaic element; and
the polymer disposed on and in contact with the mesh and disposed on and in contact with the first surface of the photovoltaic element, the polymer covering the first surface of the photovoltaic element, at least a portion of the mesh not having the polymer disposed thereon to allow for contact of a catalyst disposed on the mesh with an aqueous electrolyte, and the polymer preventing contact between the first surface of the photovoltaic element and the aqueous electrolyte.

12. The method of claim 11, further comprising:
depositing the catalyst on the mesh.

13. The method of claim 11, wherein the polymer comprises an optically transparent polymer.

14. The method of claim 11, wherein operation (e) comprises heating the photovoltaic element, the mesh, and the polymer to a temperature of about 25° C. to 85° C. for about 6 hours to 18 hours.

15. The method of claim 11, wherein operation (e) comprises exposing the polymer to ultraviolet light.

16. The method of claim 11, further comprising:
after operation (e), electroplating the catalyst onto the portion of the mesh.

17. The method of claim 11, further comprising:
prior to operation (b), imparting concavity to a first surface of the mesh, and wherein the first surface of the mesh is contacted to the first surface of the photovoltaic element in operation (b).

18. The method of claim 11, wherein pressure is applied to the mesh is operations (c) through (e) using a fixture including a plurality of posts attached to a substrate.

19. The method of claim 11, further comprising:
degassing the polymer prior to operation (d).

20. A solar fuel generator comprising:
a photovoltaic element, the photovoltaic element comprising a multi-junction photovoltaic element comprising three or more different semiconductor materials and operable to generate a photovoltage and an electrical current, the photovoltaic element having a first surface;
a mesh disposed on and in contact with the first surface of the photovoltaic element, the mesh being electrically conductive and having a catalyst disposed thereon; and
a polymer disposed on and in contact with the mesh and disposed on and in contact with the first surface of the photovoltaic element, the polymer covering the first surface of the photovoltaic element, at least a portion of the mesh not having the polymer disposed thereon to allow for contact of the catalyst disposed on the mesh with an aqueous electrolyte, and the polymer preventing contact between the first surface of the photovoltaic element and the aqueous electrolyte.

* * * * *